US012288504B2

(12) United States Patent
Hsieh et al.

(10) Patent No.: US 12,288,504 B2
(45) Date of Patent: Apr. 29, 2025

(54) ELECTRICAL APPARATUS AND DRIVER APPARATUS FOR IMPROVING STREAKING OF DISPLAYED IMAGE

(71) Applicant: Innolux Corporation, Miaoli County (TW)

(72) Inventors: Ming-Feng Hsieh, Miaoli County (TW); Pei-Hung Hsieh, Miaoli County (TW); Meng-Chang Tsai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 104 days.

(21) Appl. No.: 18/179,387

(22) Filed: Mar. 7, 2023

(65) Prior Publication Data

US 2023/0326390 A1 Oct. 12, 2023

(30) Foreign Application Priority Data

Apr. 1, 2022 (CN) ........................ 202210339770.3

(51) Int. Cl.
*G09G 3/20* (2006.01)

(52) U.S. Cl.
CPC ... *G09G 3/2096* (2013.01); *G09G 2300/0823* (2013.01); *G09G 2310/0254* (2013.01); *G09G 2310/027* (2013.01); *G09G 2310/08* (2013.01)

(58) Field of Classification Search
CPC ............................................. G09G 2310/0254
See application file for complete search history.

(56) References Cited

U.S. PATENT DOCUMENTS

2002/0080107 A1* 6/2002 Fujimoto ............. G09G 3/3611 345/87
2002/0089485 A1* 7/2002 Youn .................... G09G 3/3614 345/99

FOREIGN PATENT DOCUMENTS

TW 494380 7/2002
TW 578135 3/2004

* cited by examiner

*Primary Examiner* — Gustavo Polo
(74) *Attorney, Agent, or Firm* — JCIPRNET

(57) ABSTRACT

The disclosure provides an electrical apparatus. The electrical apparatus includes a timing controller, a data driver circuit, and a display panel. The timing controller is configured to receive at least one data polarity configuration signal. The timing controller generates and outputs a plurality of polarity inversion signals according to the data polarity configuration signal. The phases of the polarity inversion signals are different. The data driver circuit is coupled to the timing controller. The data driver circuit is configured to receive the polarity inversion signals. The display panel is coupled to the data driver circuit. The display panel is configured to display images. The data driver circuit drives the display panel to display the images according to the polarity inversion signals.

18 Claims, 7 Drawing Sheets

ELECTRICAL APPARATUS AND DRIVER APPARATUS FOR IMPROVING STREAKING OF DISPLAYED IMAGE

CROSS-REFERENCE TO RELATED APPLICATION

This application claims the priority benefit of China application serial no. 202210339770.3, filed on Apr. 1, 2022. The entirety of the above-mentioned patent application is hereby incorporated by reference herein and made a part of this specification.

BACKGROUND

Technical Field

The disclosure relates to an electrical apparatus and a driver apparatus for driving the electrical apparatus, and more particularly to a display device and a driver apparatus for driving the display device.

Description of Related Art

In the existing technology, when an electrical apparatus is a display device including a display panel, column inversion is mainly used by the data driver circuit to drive the display panel after considering the power of the data driver circuit and the charging capacity of the display panel. However, when aging and/or leakage problem occurs in the transistor inside the display panel, the DC stress of the transistor may be relieved through data transition. In addition, the driving method of data transition may also bring more flexibility to the structure layout of groups of substrates having transistors, and may optimize the optical and/or electrical characteristics of the display panel.

When the display panel is driven under normal charging, the polarity of the data provided to the display panel is generally changed in the way of two line inversion. However, by adopting the driving method of two line inversion, horizontal dark stripes may appear on the displayed image at the location where polarity reversal occurs in the data provided to the display panel, which is easily detected by human eyes and degrades visual quality. And more lines of polarity reversal (e.g., 4 lines or more) will further degrades the visual quality due to excessive spatial period of the displayed image.

SUMMARY

The disclosure provides an electrical apparatus and a driver apparatus for driving the electrical apparatus, which may improve the streaking of the displayed image caused by line inversion by modulating the polarity inversion signal, thereby improving the visual quality.

The electrical apparatus of the disclosure includes a timing controller, a data driver circuit, and a display panel. The timing controller is configured to receive at least one data polarity configuration signal. The timing controller generates and outputs multiple polarity inversion signals according to the data polarity configuration signal. The phases of the polarity inversion signals are different. The data driver circuit is coupled to the timing controller. The data driver circuit is configured to receive the polarity inversion signals. The display panel is coupled to the data driver circuit. The display panel is configured to display images. The data driver circuit drives the display panel to display the images according to the polarity inversion signals.

In an embodiment of the disclosure, the data polarity configuration signal includes a first data polarity configuration signal. The polarity inversion signals include a first polarity inversion signal and a second polarity inversion signal. The first data polarity configuration signal is taken as the first polarity inversion signal. The second polarity inversion signal is generated according to the first polarity inversion signal.

In an embodiment of the disclosure, the timing controller performs phase reversal on the first polarity inversion signal to generate the second polarity inversion signal.

In an embodiment of the disclosure, the data polarity configuration signal further includes a second data polarity configuration signal. The polarity inversion signals include a third polarity inversion signal and a fourth polarity inversion signal. The second data polarity configuration signal is taken as the third polarity inversion signal. The fourth polarity inversion signal is generated according to the third polarity inversion signal.

In an embodiment of the disclosure, the timing controller performs phase reversal on the third polarity inversion signal to generate the fourth polarity inversion signal.

In an embodiment of the disclosure, the data polarity configuration signal includes a first data polarity configuration signal and a second data polarity configuration signal. The phases of the first data polarity configuration signal and the second data polarity configuration signal are different.

In an embodiment of the disclosure, the timing controller receives the first data polarity configuration signal from an upper level circuit, and generates the second data polarity configuration signal according to the first data polarity configuration signal.

In an embodiment of the disclosure, the timing controller receives the first data polarity configuration signal and the second data polarity configuration signal from the upper level circuit.

In an embodiment of the disclosure, the display panel includes multiple sub-pixels. The polarity inversion signals drive the display panel, so that polarities of any of the sub-pixels in any row and at least one of adjacent sub-pixels on two sides are different.

In an embodiment of the disclosure, the timing controller drives the display panel to display the images by area domain low color shift.

The driver apparatus of the disclosure is configured to drive an electrical apparatus. The electrical apparatus includes a display panel. The display panel is configured to display images. The driver apparatus includes a timing controller and a data driver circuit. The timing controller is configured to receive at least one data polarity configuration signal, and generate and output multiple polarity inversion signals according to the data polarity configuration signal. The phases of the polarity inversion signals are different. The data driver circuit is coupled to the timing controller. The data driver circuit is configured to receive the polarity inversion signals. The data driver circuit drives the display panel to display the images according to the polarity inversion signals.

To make the aforementioned more comprehensible, several embodiments accompanied with drawings are described in detail as follows.

DESCRIPTION OF THE EMBODIMENTS

Figure 1A:
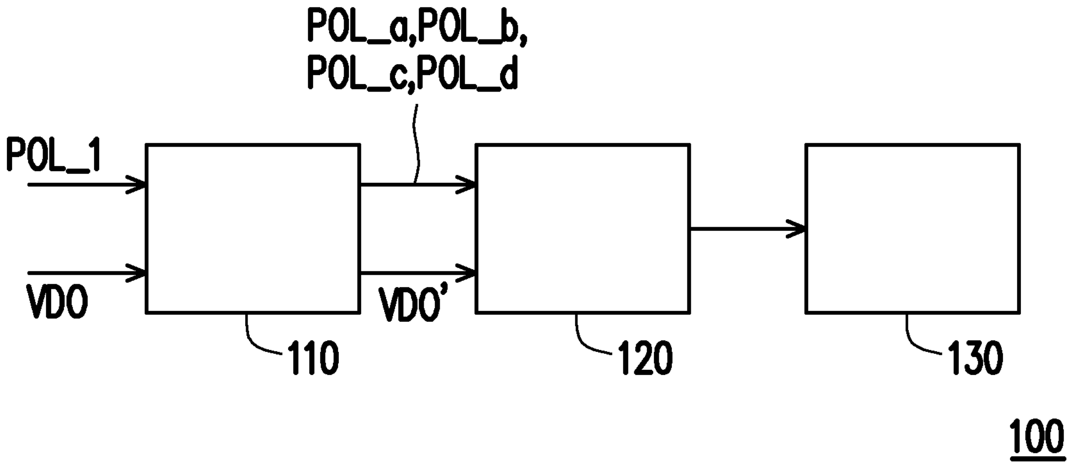
FIG. 1A is a block schematic diagram of an electrical apparatus according to an embodiment of the disclosure.

This disclosure may be understood by referring to the following detailed description in conjunction with the accompanying drawings. It should be noted that, in order to facilitate understanding and for the concision of the drawings, only a part of the electrical apparatus is shown in the drawings in this disclosure, and the specific components in the drawings are not drawn according to actual scale. In addition, the number and size of each component in the figure are only exemplary and are not used to limit the scope of the disclosure.

In the following description and claims, the words "having" and "including" are open-ended words and thus should be interpreted as meaning "including but not limited to."

Although the terms "first," "second," "third" and the like may be used to describe various components, the components are not limited to the terms. The terms are only used to distinguish one single component from other components in the specification. The same terms may not be used in the claims, and may be replaced with "first," "second," "third" and the like in the order in which the elements in the claims are declared. Accordingly, a first component in the following description may be a second component in the claims.

In some embodiments of the disclosure, terms related to joining and connecting, such as "connected", "interconnected", etc., unless otherwise defined, may mean that the two structures are in direct contact, or may also mean that the two structures are not in direct contact, and there are other structures located between these two structures. And the terms regarding joining and connecting may also refer to the circumstances where both structures are movable, or both structures are fixed. Furthermore, the term "coupled" refers to any direct and indirect electrical connection. In the case of direct connection, the terminals of components on two circuits are directly connected or connected to each other by a conductor line, and in the case of indirect connection, there are switches, diodes, capacitors, inductors, resistors, other suitable components, or a combination of the above-mentioned components between the terminals of the components on the two circuits, but the disclosure is not limited thereto.

In the disclosure, the electrical apparatus may include a display device, an antenna device, a sensing device, a light emitting device, or a splicing device, but the disclosure is not limited thereto. The electrical apparatus may include a bendable or flexible electrical apparatus. The electrical apparatus may include an electronic component. The electrical apparatus includes, for example, a liquid crystal layer or a light emitting diode (LED). The electronic components may include passive components and active components, such as capacitors, resistors, inductors, variable capacitors, filters, diodes, transistors, inductors, MEMS, liquid crystal chips, controllers, etc., but not limited thereto. The diodes may include light emitting diodes or photodiodes. Light emitting diodes may include, for example, organic light emitting diodes (OLEDs), mini LEDs, micro LEDs, quantum dot LEDs, fluorescence, phosphor or other suitable materials, or a combination of the above, but not limited thereto. Sensors may include, for example, capacitive sensors, optical sensors, electromagnetic sensors, fingerprint sensors (FPS), touch sensors, antennas, or pen sensors, etc., but not limited thereto. The controller may include, for example, a timing controller, etc., but is not limited thereto. Hereinafter, a display device will be used as an electrical apparatus in the description of the disclosure, but the disclosure is not limited thereto.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

Figure 1B:
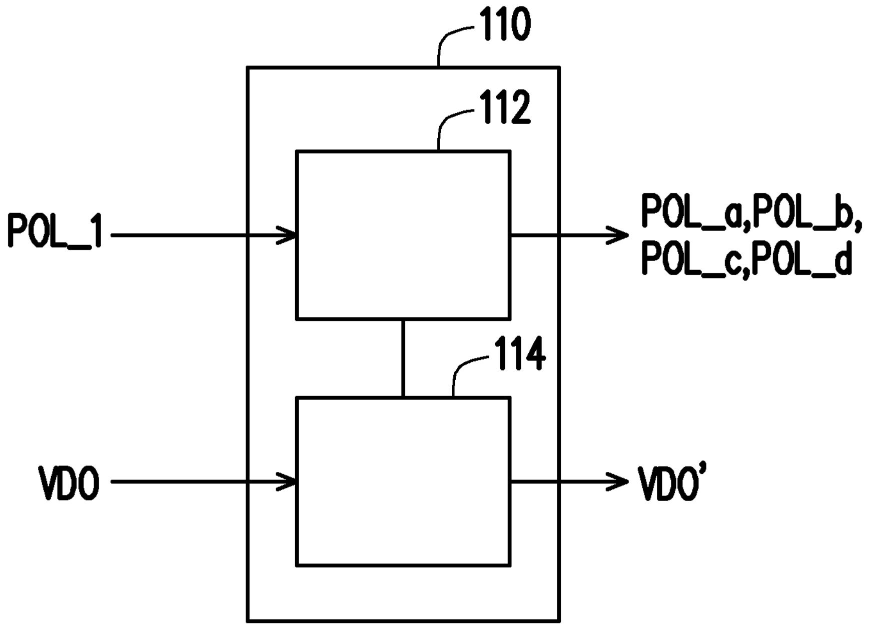
FIG. 1B is a block schematic diagram of the timing controller of FIG. 1A.

FIG. 1A is a block schematic diagram of an electrical apparatus according to an embodiment of the disclosure. FIG. 1B is a block schematic diagram of the timing controller of FIG. 1A. Referring to FIG. 1A and FIG. 1B, an electrical apparatus 100 includes a timing controller 110, a data driver circuit 120, and a display panel 130. The driver apparatus includes a timing controller 110 and a data driver circuit 120.

In FIG. 1A, the timing controller 110 is configured to receive at least one data polarity configuration signal POL_1 (first data polarity configuration signal). The timing controller 110 generates and outputs multiple polarity inversion signals according to the data polarity configuration signal POL_1, such as a polarity inversion signal POL_a, a polarity inversion signal POL_b, a polarity inversion signal POL_c, and a polarity inversion signal POL_d. In this embodiment, the phases of the polarity inversion signal POL_a, the polarity inversion signal POL_b, the polarity inversion signal POL_c, and the polarity inversion signal POL_d are different. The data driver circuit 120 is coupled to the timing controller 110. The data driver circuit 120 is configured to receive the polarity inversion signal POL_a, the polarity inversion signal POL_b, the polarity inversion signal POL_c, and the polarity inversion signal POL_d. The display panel 130 is coupled to the data driver circuit 120. The data driver circuit 120 drives the display panel 130 according to the polarity inversion signal POL_a, the polarity inversion signal POL_b, the polarity inversion signal POL_c, and the polarity inversion signal POL_d, so that the display panel 130 displays images. In this embodiment, the numbers of the data polarity configuration signal POL_1 and the polarity inversion signal POL_a, the polarity inversion signal POL_b, the polarity inversion signal POL_c, and the polarity inversion signal POL_d are only used for illustrative purposes, which are not intended to limit the disclosure.

In FIG. 1B, the timing controller 110 includes a signal modulation circuit 112 and a data processing circuit 114. The signal modulation circuit 112 generates and outputs the polarity inversion signal POL_a, the polarity inversion signal POL_b, the polarity inversion signal POL_c, and the polarity inversion signal POL_d to the data driver circuit 120 according to the data polarity configuration signal POL_1. The data processing circuit 114 is configured to receive a video signal VDO and process grayscale data in the video signal VDO, thereby driving the display panel 130 to display the images by area domain low color shift. Therefore, in an embodiment, the timing controller 110 may drive the display panel 130 to display the images by area domain low color shift.

Specifically, the data processing circuit 114 adjusts the video signal VDO to generate a display video signal VDO'. For example, the data processing circuit 114 adjusts the grayscale data of the video signal VDO referring to an internal look up table (LUT) to improve image quality. The look up table may include data adjustment information providing gamma correction, area domain low color shift and/or over driving to generate the display video signal VDO'.

Figure 2B:
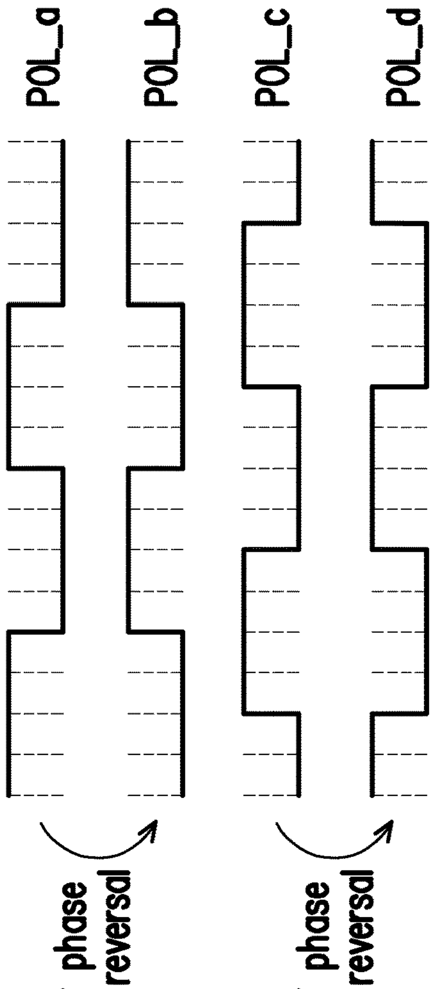
FIG. 2B is a waveform schematic diagram of a polarity inversion signal according to an embodiment of the disclosure.
Figure 2A:
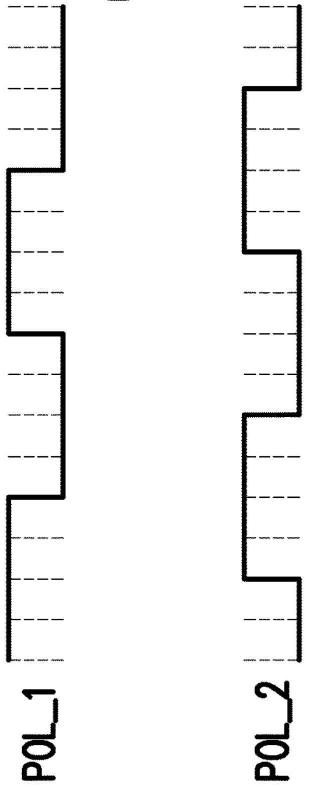
FIG. 2A is a waveform schematic diagram of a data polarity configuration signal according to an embodiment of the disclosure.

FIG. 2A is a waveform schematic diagram of a data polarity configuration signal according to an embodiment of the disclosure. FIG. 2B is a waveform schematic diagram of a polarity inversion signal according to an embodiment of the disclosure. Referring to FIG. 2A and FIG. 2B, in this embodiment, the data polarity configuration signal includes a first data polarity configuration signal POL_1 and a second data polarity configuration signal POL_2. As shown in FIG. 2A, the phases of the first data polarity configuration signal POL_1 and the second data polarity configuration signal POL_2 are different.

In this embodiment, the timing controller 110, for example, receives the first data polarity configuration signal POL_1 from an upper level circuit, and generates the second data polarity configuration signal POL_2 according to the first data polarity configuration signal POL_1. For example, the timing controller 110 may receive a first data polarity configuration signal POL_1 from a system on a chip (SoC) disposed on the upper level thereof, and the first data polarity configuration signal POL_1 is modulated by the signal modulation circuit 112 to generate the second data polarity configuration signal POL_2 with a different phase. In an embodiment, the timing controller 110 may also directly receive the first data polarity configuration signal POL_1 and the second data polarity configuration signal POL_2 from the upper level circuit.

In this embodiment, the polarity inversion signal includes a first polarity inversion signal POL_a, a second polarity inversion signal POL_b, a third polarity inversion signal POL_c, and a fourth polarity inversion signal POL_d. As shown in FIG. 2B, the phases of the first polarity inversion signal POL_a, the second polarity inversion signal POL_b, the third polarity inversion signal POL_c, and the fourth polarity inversion signal POL_d are different.

Specifically, the first data polarity configuration signal POL_1 may be taken as the first polarity inversion signal POL_a, and the second polarity inversion signal POL_b may be generated according to the first polarity inversion signal POL_a. The timing controller 110 performs phase reversal on the first polarity inversion signal POL_a through the signal modulation circuit 112 to generate the second polarity inversion signal POL_b. The second data polarity configuration signal POL_2 may be taken as the third polarity inversion signal POL_c, and the fourth polarity inversion signal POL_d may be generated according to the third polarity inversion signal POL_c. The timing controller 110 performs phase reversal on the third polarity inversion signal POL_c through the signal modulation circuit 112 to generate the fourth polarity inversion signal POL_d.

Therefore, the timing controller 110 generates and outputs the polarity inversion signal POL_a, the polarity inversion signal POL_b, the polarity inversion signal POL_c, and the polarity inversion signal POL_d with different phases to the data driver circuit 120 according to the data polarity configuration signal POL_1 and the data polarity configuration signal POL_2. Next, the data driver circuit 120 drives the display panel 130 according to the polarity inversion signal POL_a, the polarity inversion signal POL_b, the polarity inversion signal POL_c, and the polarity inversion signal POL_d, so that sub-pixels on the display panel 130 have a polarity distribution of line inversion.

Figure 3A:
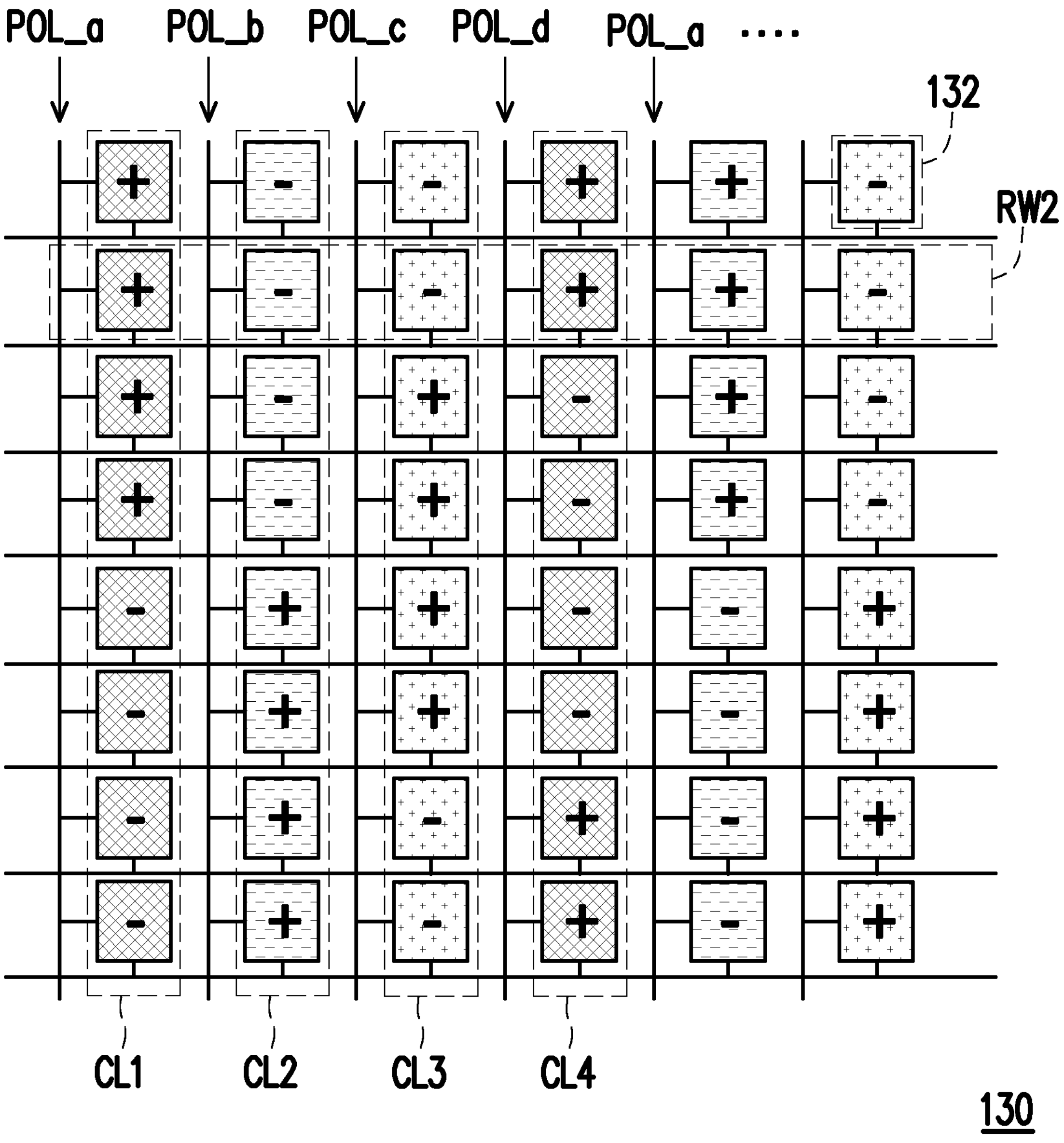
FIG. 3A is a polarity distribution diagram of sub-pixels on a display panel according to an embodiment of the disclosure.
Figure 3B:
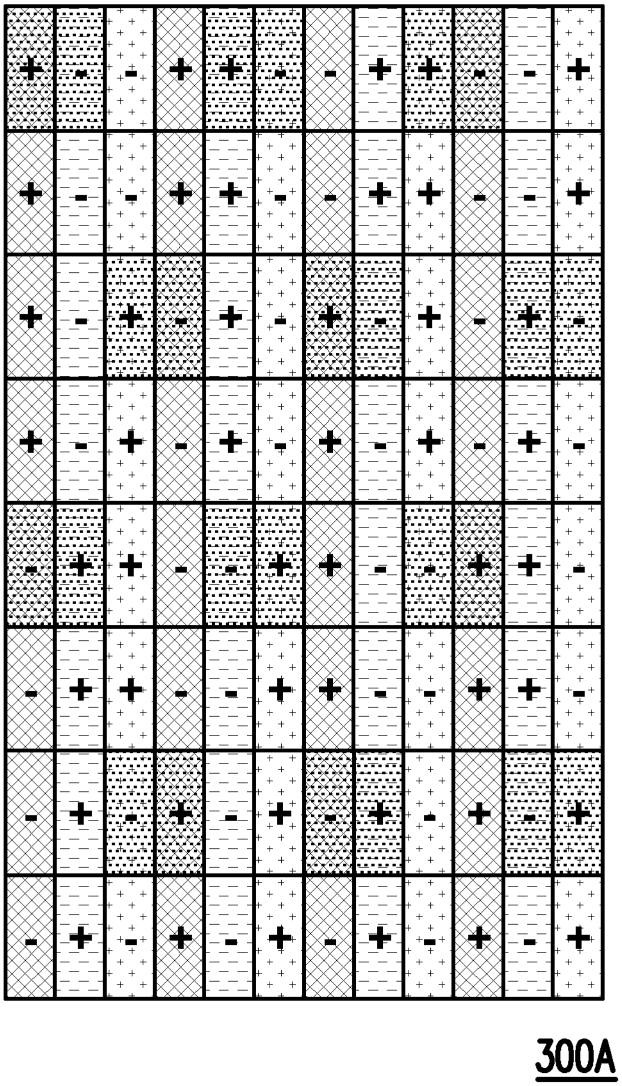
FIG. 3B is a schematic diagram of an image displayed on a display panel according to an embodiment of the disclosure.

FIG. 3A is a polarity distribution diagram of sub-pixels on a display panel according to an embodiment of the disclosure. FIG. 3B is a schematic diagram of an image displayed on a display panel according to an embodiment of the disclosure. Referring to FIG. 3A and FIG. 3B, corresponding to the polarity distribution of the sub-pixels on the display panel 130 in FIG. 3A, the display panel 130 displays, for example, an image 300A as shown in FIG. 3B. In this embodiment, the display panel 130 includes multiple sub-pixels 132. The polarity inversion signal POL_a, the polarity inversion signal POL_b, the polarity inversion signal POL_c, and the polarity inversion signal POL_d drive the display panel 130, so that the polarities of some of the sub-pixels in the same row or the same column are different. For example, the polarities of any of the sub-pixels in any row and at least one of adjacent sub-pixels on two sides are different. In FIG. 3A, the sub-pixels on the display panel 130 present a polarity distribution of four line inversion, but it is not limited thereto.

The data driver circuit 120 drives a pixel column CL1, a pixel column CL2, a pixel column CL3, and a pixel column CL4 corresponding to the display panel 130 according to the polarity inversion signal POL_a, the polarity inversion signal POL_b, the polarity inversion signal POL_c, and the polarity inversion signal POL_d. For example, the data driver circuit 120 drives the pixel column CL1 according to the polarity inversion signal POL_a; the data driver circuit 120 drives the pixel column CL2 according to the polarity inversion signal POL_b; the data driver circuit 120 drives the pixel column CL3 according to the polarity inversion signal POL_c; and the data driver circuit 120 drives the pixel column CL4 according to the polarity inversion signal POL_d. The corresponding polarity inversion signal driving the rest of the pixel columns may be deduced in this way. The pixel column CL1, the pixel column CL2, and the pixel column CL3 may display different colors. For example, the pixel column CL1 may display red, the pixel column CL2 may display green, and the pixel column CL3 may display blue, but not limited thereto. The pixel column CL1 and the pixel column CL4 may display the same color, but not limited thereto.

Thus, the data driver circuit 120 drives the pixel column CL1, the pixel column CL2, the pixel column CL3, and the pixel column CLA corresponding to the display panel 130 according to the polarity inversion signal POL_a, the polarity inversion signal POL_b, the polarity inversion signal POL_c, and the polarity inversion signal POL_d, so that the sub-pixels 132 on the display panel 130 present the polarity distribution as shown in FIG. 3A. In FIG. 3A, the polarities of some of the sub-pixels in the same row or the same column are different. For example, the polarities of some of the sub-pixels located in pixel column CL1 are different, and the polarities of some of the sub-pixels located in a pixel row RW2 are also different.

In FIG. 3A, each of the pixel columns adjusts the polarity of the sub-pixels according to the corresponding polarity inversion signal thereof. Taking the pixel column CL1 as an example, the polarity inversion signal POL_a makes the first four sub-pixels in the pixel column CL1 from top to bottom to have the same polarity (e.g., positive polarity), and the last four sub-pixels also have the same polarity, but opposite to the polarity of the first four sub-pixels (e.g., negative polarity). In addition, in FIG. 3A, each of the pixel rows also adjusts the polarity of the sub-pixel according to the polarity inversion signal. Taking the pixel row RW2 as an example, the polarity inversion signal POL_a, the polarity inversion signal POL_b, the polarity inversion signal POL_c, and the polarity inversion signal POL_d make the sub-pixels in the pixel row RW2 from left to right to have positive polarity, negative polarity, negative polarity, positive polarity, positive polarity, negative polarity in a sequence, as shown in FIG. 3A. Thus, the polarities of any of the sub-pixels in the pixel row RW2 and at least one of adjacent sub-pixels on two sides are different.

Therefore, in this embodiment, the timing controller 110 outputs N polarity inversion signals according to M data polarity configuration signals, so that the data driver circuit 120 drives the display panel 130 according to N polarity inversion signals, where M and N are positive integers no less than 2. Therefore, N line inversion may be realized on the display panel 130. The location of the sub-pixels where the polarity reversal occurs in the data in each of the pixel columns do not completely fall on the same pixel row, thereby reducing the continuous dark stripes that appear on the image 300A, as shown in FIG. 3B. The difference in brightness of the display panel 130 during data polarity transitions noticed by human eyes may be reduced, thereby improving the visual quality.

Figure 4A:
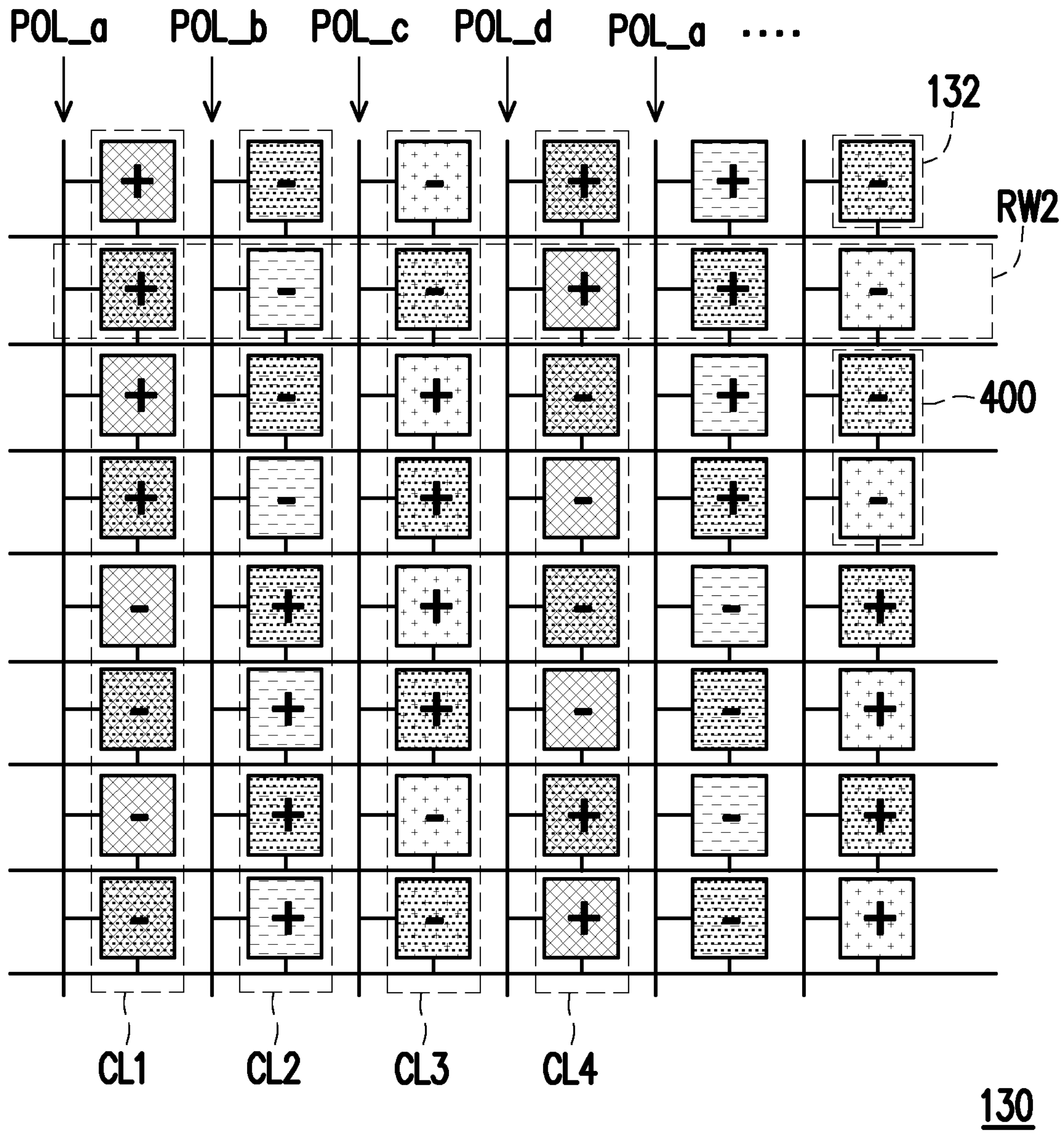
FIG. 4A is a polarity distribution diagram of sub-pixels on a display panel according to another embodiment of the disclosure.
Figure 4B:
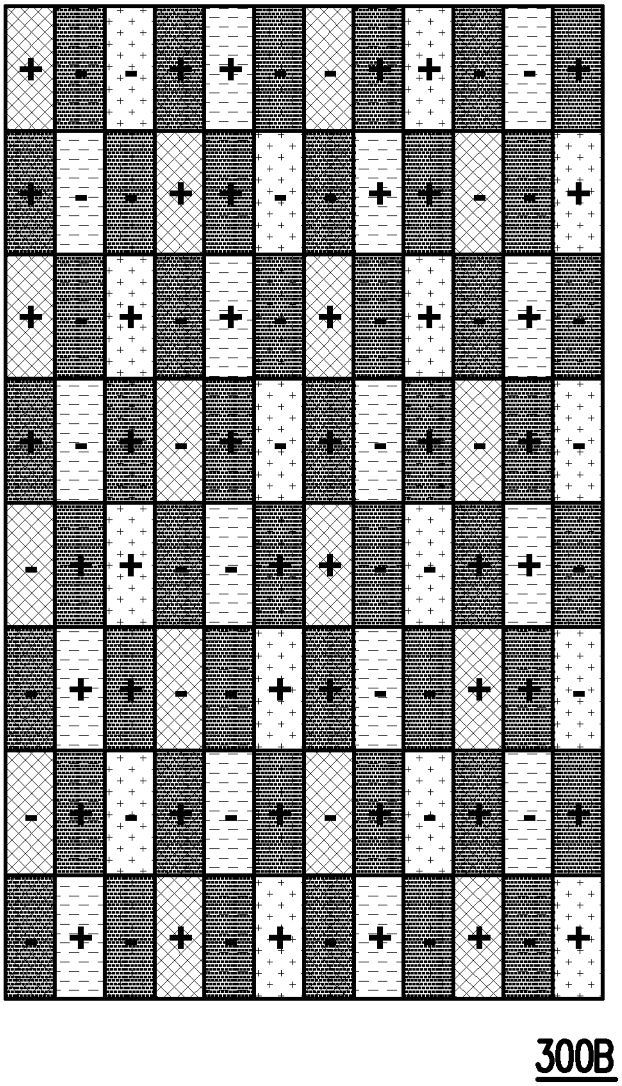
FIG. 4B is a schematic diagram of an image displayed on a display panel according to another embodiment of the disclosure.

FIG. 4A is a polarity distribution diagram of sub-pixels on a display panel according to another embodiment of the disclosure. FIG. 4B is a schematic diagram of an image displayed on a display panel according to another embodiment of the disclosure. Referring to FIG. 4A and FIG. 4B, the driving method of the display panel 130 of this embodiment is similar to the embodiment of FIG. 3A, but the main difference between the two is that the timing controller 110 further drives the display panel 130 to display the image 300B by area domain low color shift.

Specifically, the timing controller 110 may process the grayscale data in the video signal VDO through the data processing circuit 114 to generate the display video signal VDO'. The display video signal VDO' may make two adjacent sub-pixels 400 on the display panel 130 present different degrees of brightness, i.e., the driving method of area domain low color shift. Therefore, in addition to displaying the polarity distribution of N line inversion on the display panel 130, two adjacent sub-pixels may also present different degrees of brightness.

Therefore, in this embodiment, the timing controller 110 outputs N polarity inversion signals according to M data polarity configuration signals, so that the data driver circuit 120 drives the display panel 130 according to N polarity inversion signals, where M and N are positive integers no less than 2. Therefore, N line inversion may be realized on the display panel 130, which may reduce the dark stripes that appear on the image 300B, as shown in FIG. 4B. Combined with the driving method of area domain low color shift, the difference in brightness of the display panel 130 during transitions noticed by human eyes may be reduced, thereby improving the visual quality.

Figure 5:
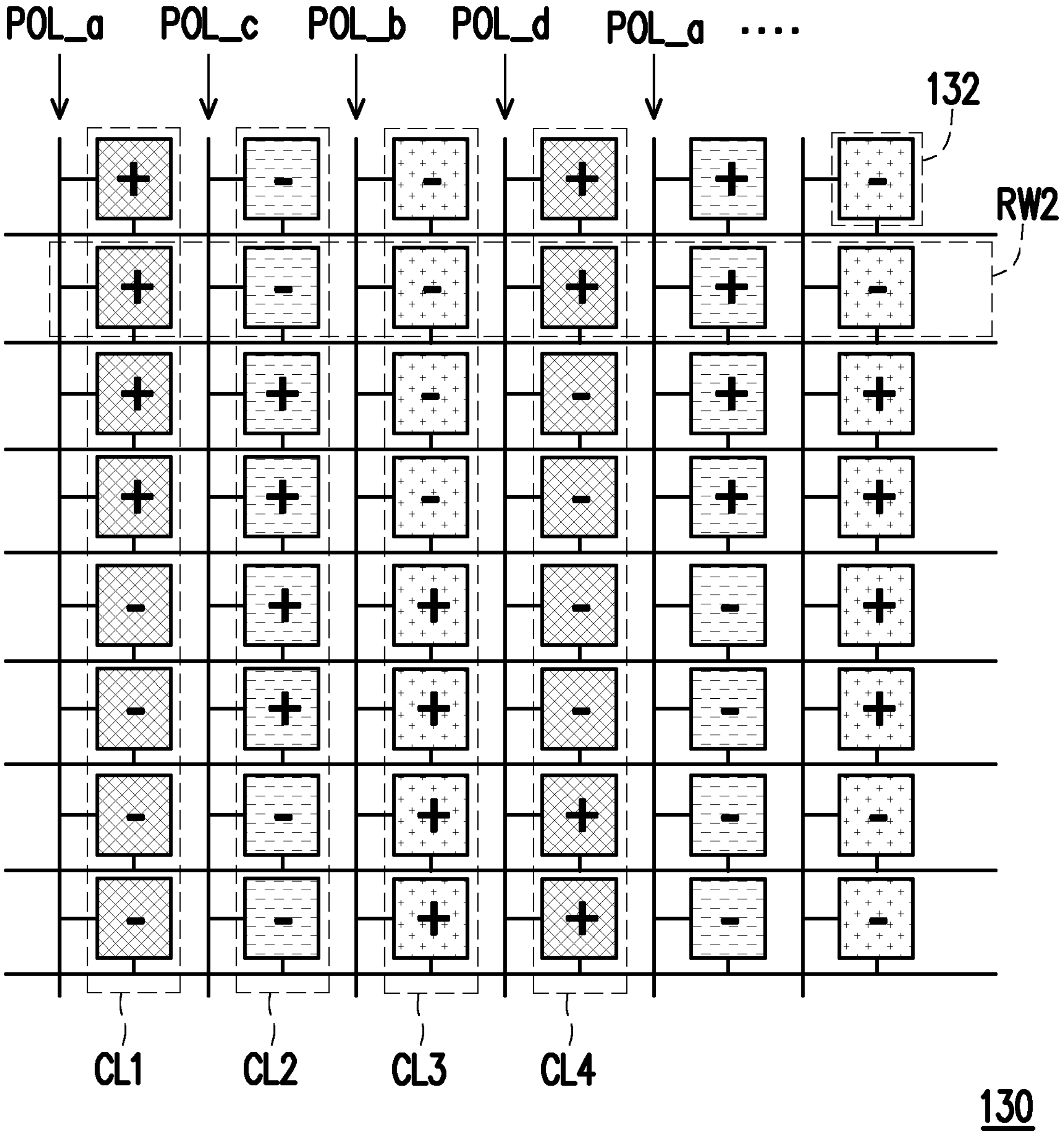
FIG. 5 is a polarity distribution diagram of sub-pixels on a display panel according to another embodiment of the disclosure.

FIG. 5 is a polarity distribution diagram of sub-pixels on a display panel according to another embodiment of the disclosure. Referring to FIG. 5, the driving method of the display panel 130 of this embodiment is similar to the embodiment of FIG. 3A, but the main difference between the two is that the corresponding relationship between the polarity inversion signal and the pixel columns.

Specifically, the data driver circuit 120 drives the pixel column CL1, the pixel column CL2, the pixel column CL3, and the pixel column CL4 corresponding to the display panel 130 according to the polarity inversion signal POL_a, the polarity inversion signal POL_c, the polarity inversion signal POL_b, and the polarity inversion signal POL_d, so that the sub-pixels 132 on the display panel 130 present the polarity distribution as shown in FIG. 5. For example, the data driver circuit 120 drives the pixel column CL1 according to the polarity inversion signal POL_a; the data driver circuit 120 drives the pixel column CL2 according to the polarity inversion signal POL_c; the data driver circuit 120 drives the pixel column CL3 according to the polarity inversion signal POL_b; and the data driver circuit 120 drives the pixel column CL4 according to the polarity inversion signal POL_d. The corresponding polarity inversion signal driving the rest of the pixel columns may be deduced in this sequence. In other words, the disclosure does not limit the correspondence between the polarity inversion signal and the pixel columns. Therefore, in this embodiment, the timing controller 110 outputs N polarity inversion signals according to M data polarity configuration signals, so that the data driver circuit 120 drives the display panel 130 according to N polarity inversion signals, where M and N are positive integers no less than 2. Therefore, N line inversion may be realized on the display panel 130, thereby further reducing the dark stripes that appear on the image. The difference in brightness of the display panel 130 during transitions noticed by human eyes may be reduced, thereby improving the visual quality.

To sum up, in the embodiment of the disclosure, the timing controller outputs multiple polarity inversion signals according to at least one data polarity configuration signals, so that the data driver circuit drives the display panel according to the polarity inversion signals. Therefore, multi-line inversion may be realized on the display panel, which may further reduce the dark stripes that appear on the image. The difference in brightness of the display panel during transitions noticed by human eyes may be reduced, thereby improving the visual quality. In an embodiment, the display panel may also be driven with area domain low color shift.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. An electrical apparatus, comprising:

a timing controller, configured to receive at least one data polarity configuration signal, and generate and output a plurality of polarity inversion signals according to the at least one data polarity configuration signal, wherein phases of the polarity inversion signals are different;

a data driver circuit, coupled to the timing controller and configured to receive the polarity inversion signals; and a display panel, coupled to the data driver circuit and configured to display images, wherein the data driver circuit drives the display panel to display the images according to the polarity inversion signals, wherein the at least one data polarity configuration signal comprises a first data polarity configuration signal, the polarity inversion signals comprise a first polarity inversion signal and a second polarity inversion signal, the first data polarity configuration signal is taken as the first polarity inversion signal, and the second polarity inversion signal is generated according to the first polarity inversion signal.

2. The electrical apparatus according to claim 1, wherein the timing controller performs phase reversal on the first polarity inversion signal to generate the second polarity inversion signal.

3. The electrical apparatus according to claim 1, wherein the at least one data polarity configuration signal further comprises a second data polarity configuration signal, the polarity inversion signals comprise a third polarity inversion signal and a fourth polarity inversion signal, the second data polarity configuration signal is taken as the third polarity inversion signal, and the fourth polarity inversion signal is generated according to the third polarity inversion signal.

4. The electrical apparatus according to claim 3, wherein the timing controller performs phase reversal on the third polarity inversion signal to generate the fourth polarity inversion signal.

5. The electrical apparatus according to claim 1, wherein the at least one data polarity configuration signal further comprises a second data polarity configuration signal, and phases of the first data polarity configuration signal and the second data polarity configuration signal are different.

6. The electrical apparatus according to claim 5, wherein the timing controller generates the second data polarity configuration signal according to the first data polarity configuration signal.

7. The electrical apparatus according to claim 5, wherein the timing controller receives the first data polarity configuration signal and the second data polarity configuration signal.

8. The electrical apparatus according to claim 1, wherein the display panel comprises a plurality of sub-pixels, the polarity inversion signals drive the display panel, so that polarities of any of the sub-pixels in any row and at least one of adjacent sub-pixels on two sides are different.

9. The electrical apparatus according to claim 1, wherein the timing controller drives the display panel to display the images by area domain low color shift.

10. A driver apparatus, configured to drive an electrical apparatus, wherein the electrical apparatus comprises a display panel configured to display images, and the driver apparatus comprises:

a timing controller, configured to receive at least one data polarity configuration signal, and generate and output a plurality of polarity inversion signals according to the at least one data polarity configuration signal, wherein phases of the polarity inversion signals are different; and a data driver circuit, coupled to the timing controller and configured to receive the polarity inversion signals, wherein the data driver circuit drives the display panel to display the images according to the polarity inversion signals, wherein the at least one data polarity configuration signal comprises a first data polarity configuration signal, the polarity inversion signals comprise a first polarity inversion signal and a second polarity inversion signal, the first data polarity configuration signal is taken as the first polarity inversion signal, and the second polarity inversion signal is generated according to the first polarity inversion signal.

11. The driver apparatus according to claim 10, wherein the timing controller performs phase reversal on the first polarity inversion signal to generate the second polarity inversion signal.

12. The driver apparatus according to claim 10, wherein the at least one data polarity configuration signal further comprises a second data polarity configuration signal, the polarity inversion signals comprise a third polarity inversion signal and a fourth polarity inversion signal, the second data polarity configuration signal is taken as the third polarity inversion signal, and the fourth polarity inversion signal is generated according to the third polarity inversion signal.

13. The driver apparatus according to claim 12, wherein the timing controller performs phase reversal on the third polarity inversion signal to generate the fourth polarity inversion signal.

14. The driver apparatus according to claim 10, wherein the at least one data polarity configuration signal further comprises a second data polarity configuration signal, and phases of the first data polarity configuration signal and the second data polarity configuration signal are different.

15. The driver apparatus according to claim 14, wherein the timing controller generates the second data polarity configuration signal according to the first data polarity configuration signal.

16. The driver apparatus according to claim 14, wherein the timing controller receives the first data polarity configuration signal and the second data polarity configuration signal.

17. The driver apparatus according to claim 10, wherein the display panel comprises a plurality of sub-pixels, the polarity inversion signals drive the display panel, so that polarities of any of the sub-pixels in any row and at least one of adjacent sub-pixels on two sides are different.

18. The driver apparatus according to claim 10, wherein the timing controller drives the display panel to display the images by area domain low color shift.

* * * * *